United States Patent Office 3,480,577
Patented Nov. 25, 1969

3,480,577
PAINT COMPOSITIONS COMPRISING EPOXY RESIN ESTER, PIGMENT AND GLASS FIBERS OR POLYPROPYLENE POWDER
James R. Hallstrom, Fanwood, and John A. Lopez, Springfield, N.J., assignors to Shell Oil Company, New York, N.Y., a corporation of Delaware
No Drawing. Filed Dec. 27, 1965, Ser. No. 516,712
Int. Cl. C09d 3/64, 5/22; E01f 9/08
U.S. Cl. 260—23                    2 Claims

ABSTRACT OF THE DISCLOSURE

Wear-resistant compositions which are especially suitable as traffic markers comprise (1) a film-forming resin, (2) an organic solvent, (3) pigment and (4) short milled glass fibers or polypropylene powder.

---

This invention relates to coating compositions which provide films of improved durability. More particularly, the invention relates to film-forming compositions of improved performance which have application in forming traffic markers upon surfaces, such as highways and pedestrian walks.

Specifically, the invention provides traffic paint compositions which form films having improved durability and wearability properties resulting in traffic markers of increased performance, for example, improved toughness and abrasion resistance, and, accordingly, are of longer life than conventional traffic markers now in use.

Since traffic paints were first applied to traffic surfaces, there has been a constant search to provide traffic paints of high performance which would not crack, peel or wear off with age. These adverse qualities of traffic paints result primarily from weather and traffic conditions. For example, the drying oil alkyl based traffic paints are known to age-harden, i.e., the polymer molecules continually absorb oxygen until finally the films becomes brittle and cracks or peels. On the other hand, traffic paints which dry slowly are picked up by vehicle tires resulting in film loss. Additionally, weather conditions, such as freeze-thaw, rain, heat, snow, etc., have noticeable adverse effects upon traffic paint films. Recently developed traffic paints, described in copending U.S. application Ser. No. 447,086, are one-package essentially non-drying, epoxy resin-based paints which dry rapidly, are not picked up by traffic, do not age-harden and have good weather resistant properties. While these latter traffic paints are quite durable, film loss thereof over a period of about one year amounts to from 10 to 30% depending on the particular surface to which they are applied and upon existing traffic and weather condition. It would, therefore, be highly desirable to provide improved traffic paints which form films that are even more durable and weather resistant than the traffic paints now in use.

Accordingly, it is an object of this invention to provide traffic markers of improved performance. It is a further object of the invention to provide traffic markers which are more permanent than conventional markers now in use. It is still a further object of the invention to provide such markers which may be formed utilizing paint compositions which may be applied with conventional application equipment. These and other objects and advantages of the invention will be apparent from the following detailed description thereof.

It has been found that these and other objectives and advantages are accomplished by the improvement of the present invention which comprises incorporating into compositions an additive selected from milled glass fibers approximately $\frac{1}{32}$–$\frac{1}{4}$ inch in length and/or polypropylene fluff (powder). Owing to the particle size of these additives as defined in accordance with the invention, paint compositions containing the additives may be applied with conventional spray application equipment, thereby eliminating special equipment which would be required to embed larger particles during or immediately after application of the paint.

Although the durability and wearability qualities of all paint compositions can be markedly improved by the addition thereto of the additives of the present invention, the most durable and wearable traffic paints are obtained when the additives are introduced into compositions which are presently considered high performance traffic paints. Accordingly, the most favorable traffic paint compositions for use in the invention include compositions comprising drying oil alkyds, non-drying alkyds, non-drying and drying epoxy resins and esters of epoxy resins, mixtures of alkyds and epoxy resins, and compositions comprising modified alkyds or epoxy resins, such as a composition comprising the reaction product of an epoxy resin and a dimer or a saturated dicarboxylic acid. Preferred traffic paint compositions are those wherein the film-forming component thereof is selected from (1) substantially non-drying epoxy resins, (2) non-drying alkyd resins, (3) reaction products of a epoxy resin and dimer acid, and (4) epoxy resin/amine curing agent compositions. A complete description of these compositions and their preparation is given in copending U.S. applications Ser. Nos. (1) 447,086, now U.S. 3,408,219, issued October 29, 1968; (2) 447,062 now abandoned and (3) 490,064; and (4) 421,630 now U.S. 3,356,624, issued December 5, 1967 respectively. Also included in the preferred traffic paint compositions are those prepared from drying epoxy resins. The term "drying" as used herein has reference to compositions which dry substantially by absorbing oxygen from the air and cure to form tough films. The "non-drying" compositions are preferred since they do not age-harden. While the above specified compositions are preferred and provide high performance films, other traffic paint compositions can suitably be used in accordance with the invention.

Of the preferred compositions specified above, the compositions wherein the film-forming comprises epoxy resins are particularly preferred, since these compositions are considered to possess good durability and wearability qualities.

One group of epoxy-containing compositions are those comprising the esterified epoxy resins formed by reacting (1) an epoxy resin prepared from epichlorohydrin and 2,2 - bis(4 - hydroxyphenyl) propane and having a molecular weight of from 1400 to 2900 and (2) a saturated monocarboxylic acid containing from 8 to 22 carbon atoms, such as lauric acid, described in Ser. No. 447,086, now U.S. 3,408,219, issued October 29, 1968.

Another group of epoxy-containing compositions are those comprising a mixture of (1) an epoxy resin which is a solid glycidyl polyether of a polyhydric phenol and (2) a liquid epoxy-containing condensate of a polycarboxylic acid and a glycidyl polyether of a polyhydric phenol, described in Ser. No. 421,630, now U.S. 3,356,624, issued Dec. 5, 1967.

Still another group of epoxy-containing compositions are those comprising the condensation product of a gylcidyl polyester of a polyhydric phenol having a molecular weight of from 300 to 1000 and an acid selected from a dimer of an unsaturated fatty acid having at least 12 carbon atoms or a saturated dicarboxylic acid, and having the general formula $A(BA)_nB$, wherein A represents the polyepoxide radical, B represents the acid radical and $n$ represents an integer, such as 1,2,3 ... 10,20,30 or even higher, described in Ser. No. 490,064.

The epoxy-containing paint compositions may conveniently be prepared by dissolving the epoxy resin component in a suitable solvent, which includes ketones, such as acetone and methyl ethyl ketone, and may include alcohols, glycol ether, toluene, xylene, benzene, mineral spirits, naphthas and other aromatic petroleum distillates, and blending pigments therewith. The solvent usually consists of a mixture of a ketone and one or more of the compounds mentioned above.

In terms of total paint compsition to which curing agents may be subsequently added the concentration of the resin component may range from about 20% to 48% by volume, the concentration of the solvent component from about 15% to 58% by volume and the concentration of the pigment component from about 17% to 51% by volume, the sum of the three compounds totaling 100%. The pigment is sometimes expressed in terms of "pigment volume concentration" which has reference to the volume of pigment with respect to the total volume of pigment and resin; the solvent being excluded in this instance since the ultimate film does not contain solvent.

A typical paint composition, for example, may be as follows:

|  | Percentage | | Pounds Per Gallon |
|---|---|---|---|
|  | Volume | Weight |  |
| Pigment* | 25 | 57 | 7.0 |
| Resin | 30 | 16 | 2.0 |
| Solvent | 45 | 25 | 3.3 |
| Total | 100 | 100 | 12.3 |

*Pigment volume concentration in this example is 45.45%.

The glass fibers or polypropylene fluff may easily be introduced into the paint compositions by mixing accomplished by any suitable means, such as stirring, blending, and the like.

The milled glass fibers which are suitable additives for use in the present invention are available commercially and are about 1/32 inch to about 1/4 inch in length and range from about 0.00021 to 0.00060 inch in diameter. Fibers having a length greater than 1/4 inch when mixed in the paint composition will clog conventional spray application equipment, and consequently could not be suitably mixed into the paint compositions prior to application thereof.

Polypropylene which is a suitable additive for use in the present invention is polypropylene fluff or powder. This material has intrinsic viscosity of about 2.3 and a bulk density of about 14–16 pounds per cubic foot. A typical particle distribution for the material is:

| Microns | Weight percent |
|---|---|
| >125 | 9 |
| 92–125 | 5 |
| 77–92 | 4 |
| 47–77 | 20 |
| 22–47 | 45 |
| 10–22 | 14 |
| <10 | 3 |
|  | 100 |

The amount of additive introduced into the paint compositions may vary over a wide range. Generally, the amount of additive present in the compositions varies from about 1/4 pound to 2 pounds of additive per gallon of paint, and usually about 1 pound of additive per gallon of paint is adequate.

The paint compsitions of the present invention may be applied to highway surfaces by presently employed conventional techniques. The compositions may be employed as "one-package" systems or a curing agent may be added to the composition. Suitable agents include epoxy curing agents such as adducts of polyepoxides and amines. The concentration of the curing agent is generally from about 5 to 60 parts per hundred parts resin, and preferably from 20 to 30 parts per hundred parts resin. A preferred curing agent is the adduct of (1) a polyepoxide which is the reaction product of 2,2-bis(4-hydroxyphenyl)propane and epichlorhydrin having a molecular weight of about 380 and an epoxide equivalent of from 180–195 and (2) diethylene triamine in molar excess. Another preferred curing agent is the reaction product of 1 mole of diethylene triamine and 4 moles of methyl isobutyl ketone.

To illustrate the manner in which the invention may be carried out, the following examples are given. It is to be understood that the examples are for the purposes of illustration and the invention is not to be regarded as limited to any specific embodiment recited therein.

EXAMPLE I

This example illustrates the improved durability and wearability of epoxy resin based traffic paint compositions which contain the additives of the invention.

A paint composition, hereinafter referred to as "Composition A" is prepared as follows:

(1) Polyether A, having a molecular weight of about 900 and an epoxide equivalent of from 450–522, is prepared by reacting 1 mole of 2,2-bis(4-hydroxyphenyl) propane, known as "Bi-phenol A," and 1.57 moles of epichlorohydrin in a 10% aqueous solution containing 1.88 moles of sodium hydroxide.

(2) Polyether B, having a molecular weight of about 350, is prepared according to the above procedure except that 4 moles of sodium hydroxide, 2 moles of "Bis-phenol A," and 10 moles of epichlorohydrin are employed.

(3) An epoxy-containing condensate is prepared by the following procedure: 384 parts of Polyether B and 296 parts of dimerized octadecadienoic acid are placed in a reaction vessel and heated. When the temperature reaches 120° C., 6.8 parts of methyl diethanolamine is added. The mixture is held at 150° C. for a period of two hours. The resulting condensate is recovered.

(4) The "Composition A" is prepared by cold blending 20 parts by weight of polyether A and 80 parts by weight of the epoxy-containing condensate, each being added as a 40% solution in a solvent comprising acetone, xylene, and ethylene glycol monoethyl ether. Pigment consisting of titanium dioxide, magnesium silicate, calcium carbonate, and diatomaceous silica is added in an amount required to produce a composition having a 45% "pigment volume concentration." The resulting composition is processed to obtain complete pigment dispersion by milling. The resulting composition is homogeneous and has a white color.

A second paint composition hereinafter referred to as "Composition B" is prepared as follows:

(1) Polyether C, having a molecular weight of about 1400 and a melting point of about 980° C., is prepared according to the procedure given for polyether A, except that 1.22 moles of epichlorhydrin, 1 mole of "Bis-phenol A" and 1.37 moles of sodium hydroxide are employed.

(2) Polyether C is then reacted with dehydrated castor oil fatty acids in a closed kettle equipped with a stirrer and containing an atmosphere of nitrogen at a temperature of about 260° C. to prepare a product which is polyether C 40% esterified with dehydrated castor oil fatty acids. This product is dissolved in a solvent comprising acetone, xylene, and ethylene glycol monoethyl ether to produce a 40% wt. solution of the product. Pigment corresponding to that used in preparing "Composition A" is added in an amount required to produce a composition having a 45% pigment volume concentration." The resulting "Composition B" is homogeneous and white in color.

Each paint composition is divided into three equal portions. To one portion of each composition there is added and thoroughly mixed one pound of polypropylene powder per gallon of composition. To a second portion of each composition there is added and thoroughly mixed one pound of milled glass fibers (1/32 inch long) per gallon of composition. No additives are introduced into the remaining portion of each composition. When the additive addition is made, the viscosity of the paint composition is slightly increased. Accordingly, additional solvent is added to regain and maintain proper application consistency.

Table I-A gives comparative test results obtained when the three portions of each paint compositions were employed to provide traffic markers upon U.S. Route 1 near Newark Airport, Newark, N.J., and U.S. Route 40 between Baltimore and Frederick, Md. In paints prepared from "composition A" a curing agent is added prior to application which is the adduct of a polyepoxide and diethylene triamine. Also included in the comparative test are three conventional alkyd resin based traffic paint compositions (containing no additives) conforming to New Jersey, Maryland or Pennsylvania specifications. The properties and composition of the alkyd resin compositions are given in Table I-B.

TABLE I-A

| | Performance, Percent Film Lost | | |
|---|---|---|---|
| | U.S. Route 40, 8½ mo. exposure | | U.S. Route 1, 9¼ mo. exposure, Concrete lane |
| | Concrete lane | Asphalt lane | |
| Epoxy "Composition A" | 10 | 15 | 20 |
| Plus milled glass fiber | 5 | 5–10 | 20 |
| Plus polypropylene powder | 10 | 15 | 5–10 |
| Epoxy "Composition B" | 15 | 20 | 20 |
| Plus milled glass fiber | 15 | 15–20 | |
| Plus polypropylene powder | 10–15 | 15–20 | |
| Pennsylvania specification | 75 | 25 | 35 |
| New Jersey specification | 50 | 25 | 25 |
| Maryland specification | 30 | 25 | 60 |

TABLE I-B

| | Maryland 1962 | | Pennsylvania 1962 | | New Jersey 1961 |
|---|---|---|---|---|---|
| | Min. | Max. | Min. | Max. | Type III |
| Vehicle: | | | | | |
| Alkyd resin solution (50% NV), percent | 83.0 | 85.0 | 83.0 | 85.0 | |
| Petroleum thinner, dries and antiskinning agent, percent | 17.0 | | 17.0 | | |
| Alkyd resin solution (60% wt.), percent | | | | | 80 |
| Chlorinated rubber solution (40% wt.), percent | | | | | 20 |

| | Alkyd Resin | | | | | |
|---|---|---|---|---|---|---|
| | Min. | Max. | Min. | Max. | Min. | Max. |
| Solids content (percent by wt.) | 49.5 | 50.5 | 49.0 | | 60 | |
| Solvent | V. M. and P. Naptha | | V. M. and P. Naptha | | Toluene | |
| Color (Gardner) | | 8 | | 9 | | 6 |
| Acid Number (total vehicle) | | a 4 | | 7 | | |
| Viscosity (Gardner-Holdt) | N–P | | J–N | | | |
| Wt. per gallon at 77° F. (pounds) | 7.5 | | 7.45 | | | |
| Aliphatic solvent tolerance | 100 to 1 | | 100 to 1 | | | |

Alkyd Resin Solids Composition

| | | | | | | |
|---|---|---|---|---|---|---|
| Phthalic anhydride, percent | 35.0 | | 34.0 | | 30.0 | |
| Fatty acids, percent | 48.0 | | 48.0 | 53.0 | 54.0 | |
| Iodine number of Fatty Acids | 115 | 130 | 115 | 130 | 115 | 130 |
| Rosin and derivitives | | None | | None | | None |
| Natural resins | | None | | None | | |
| Other synthetic resins | | None | | None | | |

Chlorinated Rubber Composition

| | | |
|---|---|---|
| Chlorine, percent | 66 | 69 |
| Color Gardner (20% wt. in toluene) | | 4 |
| Viscosity (cps.) (20% wt. in toluene) | 9 | 25 |

Chlorinated Rubber Solution (by weight)

| | |
|---|---|
| Chlorinated rubber (10 or 20 cps. type) | 40 |
| Propylene oxide or Epichlorohydrin | 0.8 |
| Benzene | 60 | a Resin solution only.

Example I demonstrates the improved results obtained when incorporating the additives of the present invention into traffic paint compositions. The incorporation of the additives into the paint compositions is simple and can be easily accomplished without the necessity of additional equipment. The epoxy-containing resin paints were chosen for testing purposes since they provide durable and wearable films. It is readily apparent, however, that the additives could suitably be incorporated into other compositions.

We claim as our invention:

1. A traffic paint composition comprising:
   (A) from about 20% to 48% by volume of a substantially nondrying, film forming epoxy composition selected from the group consisting of:
      (1) condensates of glycidyl polyethers of 2,2-bis-(4-hydroxyphenyl)propane and saturated monocarboxylic acids containing from 8 to 22 carbon atoms,
      (2) mixtures of a solid glycidyl polyether of a polyhydric phenol and a liquid epoxy-containing condensate of a polycarboxylic acid and a glycidyl polyether of a polyhydric phenol,
      (3) condensation products of a glycidyl polyether of a polyhydric phenol and a dimerized unsaturated fatty acid having at least 12 carbon atoms or a saturated dicarboxylic acid, and
      (3) an epoxy resin 40% esterified with dehydrated castor oil fatty acids, said epoxy resin being the reaction product of epichlorohydrin and 2,2-bis-(4-hydroxyphenyl)propane and having a molecular weight of about 1400.
   (B) from 15 to 58% by volume of an organic solvent;
   (C) from 17 to 51% by volume of pigment, and
   (D) from about ¼ of 2 pounds per gallon of the paint of an additive selected from the group consisting of milled glass fibers having a length of from 1/32 to ¼ inch and polypropylene powder having approximately 88% by weight particle size distribution between about 10 and 125 microns.

2. A traffic paint composition as in claim 1 wherein said resin is a cold melt blend containing (A) 80% by weight of a condensate which is the reaction product of dimerized octadecadienoic acid reacted with at least 2 times the chemical equivalent amount of an epoxy resin having a molecular weight of about 350 formed by reacting epichlorohydrin and 2,2-bis(4-hydroxyphenyl)propane, and (B) 20% by weight of an epoxy resin having a molecular weight of about 900 which is the reaction product of epichlorohydrin and 2,2-bis(4-hydroxyphenyl)propane.

References Cited

UNITED STATES PATENTS

| | | | |
|---|---|---|---|
| 3,283,036 | 11/1966 | Larson | 260—897 |
| 3,291,776 | 12/1966 | Newey et al. | 260—47 |
| 3,294,863 | 12/1966 | De Acetis et al. | 260—830 |
| 3,330,684 | 7/1967 | Wheeler | 117—38 |
| 3,356,624 | 12/1967 | Neal et al. | 260—18 |
| 3,397,169 | 8/1968 | Wilkinson | 260—37 |

OTHER REFERENCES

Skeist et al., "Epoxy Resins," 1958, p. 77, TP 986 E6 S52.

Oleesky et al., Handbook of Reinforced Plastics, 1964, p. 147.

DONALD E. CZAJA, Primary Examiner

R. A. WHITE, Assistant Examiner

U.S. Cl. X.R.

260—18, 32.8, 33.6, 37, 41, 837